United States Patent [19]

Conrad et al.

[11] 3,963,678
[45] June 15, 1976

[54] LARGE DENIER POLYETHYLENE TEREPHTHALATE MONOFILAMENTS HAVING GOOD TRANSVERSE PROPERTIES

[75] Inventors: Roddy Merl Conrad, Hamm, Germany; Lyman Lyle Holland, Kinston, N.C.

[73] Assignee: E. I. Du Pont de Nemours and Company, Wilmington, Del.

[22] Filed: June 17, 1974

[21] Appl. No.: 480,289

[52] U.S. Cl. .......................... 260/75 T; 264/178 F; 264/210 F
[51] Int. Cl.² ................... C08G 63/18; C08G 63/70
[58] Field of Search ............... 260/75 T; 264/290 T, 264/210 F

[56] References Cited
UNITED STATES PATENTS

| | | | |
|---|---|---|---|
| 2,615,784 | 10/1952 | McClellan | 264/290 T |
| 2,880,057 | 3/1959 | Cuculo | 260/75 T X |
| 2,934,400 | 4/1960 | Siggel et al. | 260/75 T X |
| 3,051,212 | 8/1962 | Daniels | 260/75 T X |
| 3,354,023 | 11/1967 | Dunnington et al. | 264/210 F X |
| 3,361,859 | 1/1968 | Cenzato | 264/210 F X |
| 3,534,120 | 10/1970 | Ando et al. | 260/75 T X |
| 3,549,597 | 12/1970 | Kitson et al. | 260/75 T |
| 3,650,884 | 3/1972 | Hanson | 161/175 |
| 3,651,198 | 3/1972 | Mitsuishi et al. | 264/290 T X |
| 3,715,421 | 2/1973 | Martin et al. | 260/75 T X |
| 3,758,658 | 9/1973 | Riggert | 264/176 F |
| 3,770,866 | 11/1973 | Sakata et al. | 264/290 T |
| 3,793,132 | 2/1974 | Bhakuni et al. | 260/75 T X |
| 3,816,486 | 6/1974 | Vail | 260/75 T |
| 3,838,561 | 10/1974 | Munting | 264/290 T |
| 3,846,377 | 11/1974 | Siegmann | 260/75 T |

FOREIGN PATENTS OR APPLICATIONS 2,161,967  6/1973  Germany

*Primary Examiner*—Murray Tillman
*Assistant Examiner*—W. C. Danison, Jr.

[57] ABSTRACT

Polyester monofilaments of 1000 to 10,000 denier per filament can be produced to have both good straight tenacity and good transverse properties (high loop tenacity) by extruding molten polyethylene terephthalate of at least 0.6 intrinsic viscosity through an air gap into a water bath to form a monofil and then drawing the monofil in two stages under controlled heating conditions to provide at least 0.190 average birefringence, measured along monofil diameters and a substantially lower birefringence value adjacent to the surface of the monofil. The monofilaments are suitable for use as reinforcement in tires, V-belts and other industrial applications.

2 Claims, 4 Drawing Figures

LARGE DENIER POLYETHYLENE TEREPHTHALATE MONOFILAMENTS HAVING GOOD TRANSVERSE PROPERTIES

BACKGROUND OF THE INVENTION

This invention relates to improved polyester monofilaments, and is more particularly concerned with monofils of polyethylene terephthalate which have suitable straight tenacity and transverse properties for reinforcing elastomeric products.

The multifilament yarns conventionally used as reinforcement in elastomeric articles have been composed of low denier filaments of polyethylene terephthalate or nylon. The filaments deniers have ranged from 3 to 12, and large numbers of filaments have been combined by plying, twisting and cabling to obtain cords of sufficient size for use as reinforcing elements. For example, tire cord deniers are in the range of 1500 to 2000, or higher, and V-belts may be reinforced with cords having total deniers of 8000 to 10,000, or more.

The disadvantages of plying, twisting and cabling low denier filaments would be avoided by the use of large denier monofilaments, if monofaments could be produced to have equivalent properties. Mitsuishi et al. U.S. Pat. No. 3,651,198 issued Mar. 21, 1972, discloses a process of drawing and then heat-treating low denier filament of 0.8 to 0.9 intrinsic viscosity polyethylene terephthalate to produce yarns having breaking strengths and elongations of 11.8 gpd./20% to 13.5 gpd/16%. The patent states, "When used as tire cord, they show excellent fatigue resistance and high strength-conversion ratio." Example 17 illustrates that an undrawn monofilament of 1200 denier can be drawn 6.2 X in two stages, at 65° and 45°C., and then heat-treated in three stages at 65°, 120° and 180°C. with 10–15% stretching in each stage, to provide a monofil of less than 200 denier having a breaking strength of 13.8 gpd. with a break elongation of 16%. The patent does not teach that a combination of high strength and fatigue resistance can be obtained in monofilaments which have deniers as large as the cords used in tires or V-belts.

It has been found that processes suitable for low denier filaments do not produce equivalent properties in large denier monofilaments. Cuculo U.S. Pat. No. 2,880,057, issued Mar. 31, 1959, discloses a process for improving the properties of monofilaments in which an undrawn filament of 20 mil. diameter is formed by extruding high molecular weight polyethylene terephthalate through an air gap into a quench tank, containing water at room temperature, and the undrawn filament is passed through a second air gap and into a heater where the filament is heated under substantially zero tension to a temperature between 160° and 210°C. to crystallize the polymer. The heat-treated filament is cold drawn in a liquid bath at up to 6 X draw ratio and is then heat-set at 190°C. The patent states that filaments are obtained which have good tensile strength and good fatigue resitance in toothbrush bristles. Surprisingly, it has been found that the above crystallizing step before drawing precludes drawing of high denier monofilaments intended for use in tires or V-belts.

Hansen U.S. Pat. No. 3,650,884, issued Mar. 21, 1972, discloses a process for producing nylon monofilaments having good tenacity and good loop tenacity. Comparison tests as reinforcement plies in tires showed the performance of such monofilaments of polyhexamethylene adipamide to be equivalent to that of commercial 66-nylon cord. The nylon monofilaments are extruded downwardly through an orifice, through a conventional air gap (i.e., usually less than 2 inches), and quenched in water in conventional manner. The quenched monofilament is drawn in two coupled stages between feed and draw rolls, using a draw ratio of about 4 X in the first stage and about 1.5 X in the second stage. Between each pair of feed and draw rolls, the monofilament passes through a radiant oven heated to between 500° and 750°C. The drawn monofilament is then passed through a steaming chamber where it is exposed for 0.2 to 1.0 second to steam at a temperature above the melting point of the polyamide in the steam atmosphere. This steaming produces a modified outer layer on the monofilament and is show to provide a marked improvement in loop tenacity without decrease in straight tenacity. Although steaming is effective for nylon, the steaming process disclosed does not improve the loop tenacity of polyester monofilaments.

SUMMARY OF THE INVENTION

The present invention provides polyethylene terephthalate monofilaments of at least 1000 denier (usually 1500 to 10,000 denier) that have a combination of good straight tenacity and high loop tenacity which makes them suitable for reinforcing elastomeric products such as tires and V-belts. The novel monofilaments of this invention have an intrinsic viscosity of at least b 0.6 (preferably at least 0.75), a straight tenacity greater than 6.0 grams per denier and a loop tenacity greater than 3.0 grams per denier. Monofilaments having a straight tenacity from 7.0 to 10.0 grams per denier and a loop tenacity from 5.0 to 7.0 grams per denier are preferred for tire plies.

The novel monofilaments have an internal structure which is substantially uniform except for lower polymer chain segment orientation near the surface, as evidenced by birefringence measurements along a cross-sectional diameter of the filament. The structure is characterized by an average briefringence ($\overline{\Delta n}$) of at least 0.190 and by a lower birefringence near the surface of the filament. The difference in birefringence is expressed as an average difference factor δ (defined subsequently) and is at least 90. When the average birefringence ($\overline{\Delta n}$) is 0.190 to 0.196, the average difference factor (δ) is preferably 110 to 145. When the value of δ is greater than 200, the structure should also have an integrated average birefringence (IAB) of at least 0.186, as discussed subsequently.

The monofilaments of this invention can be produced as illustrated subsequently, using conventional types of equipment.

DEFINITIONS AND TEST METHODS

Figure 1:
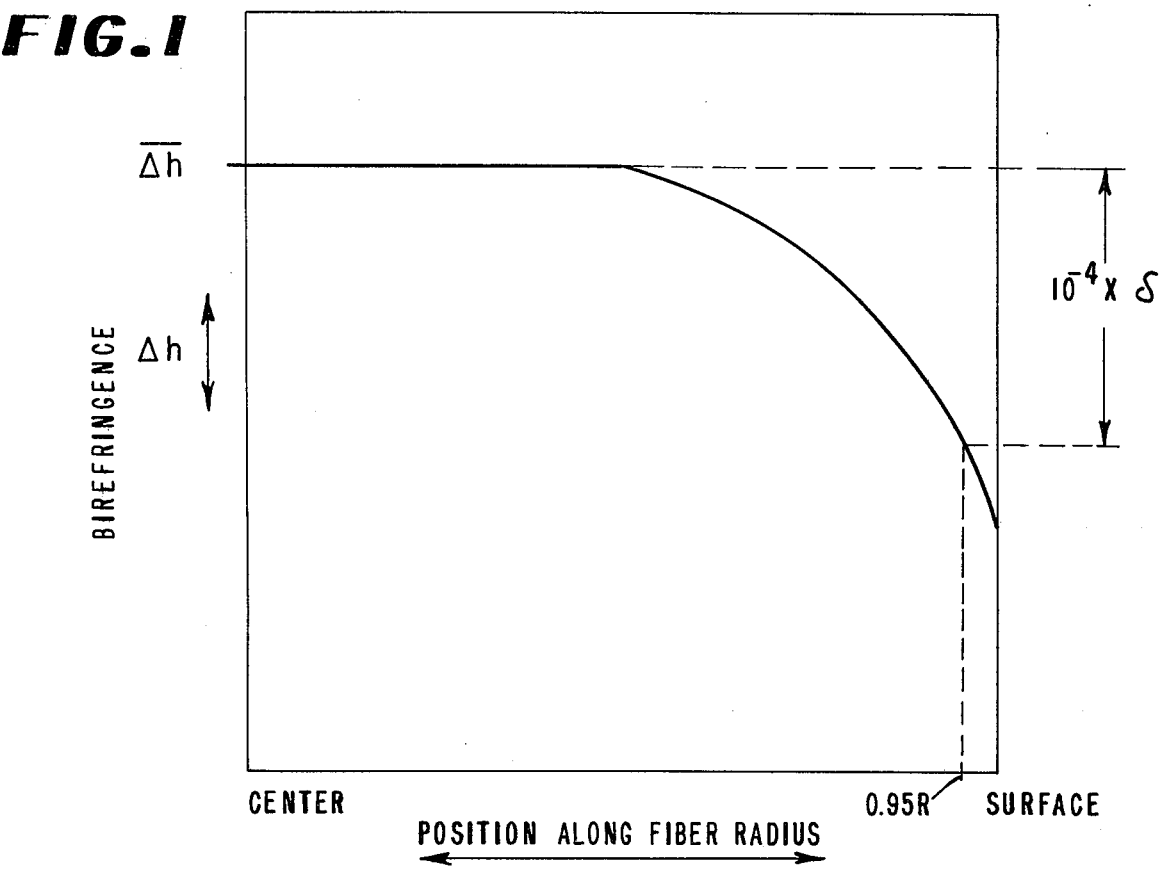
FIG. 1 is a schematic representation of a graph showing values of birefringence as a function of the position of measurement along the radius of a fiber, and showing definition of terms. $\overline{\Delta n}$ is defined as the average birefringence measured at the center, i.e., along a fiber diameter. $10^{-4}\delta$ is difference between $\overline{\Delta n}$ and the birefringence measured along a chord of the fiber cross section at point 0.95 R, i.e., at a point 0.95 of the distance between fiber center and fiber surface.
Figure 3:
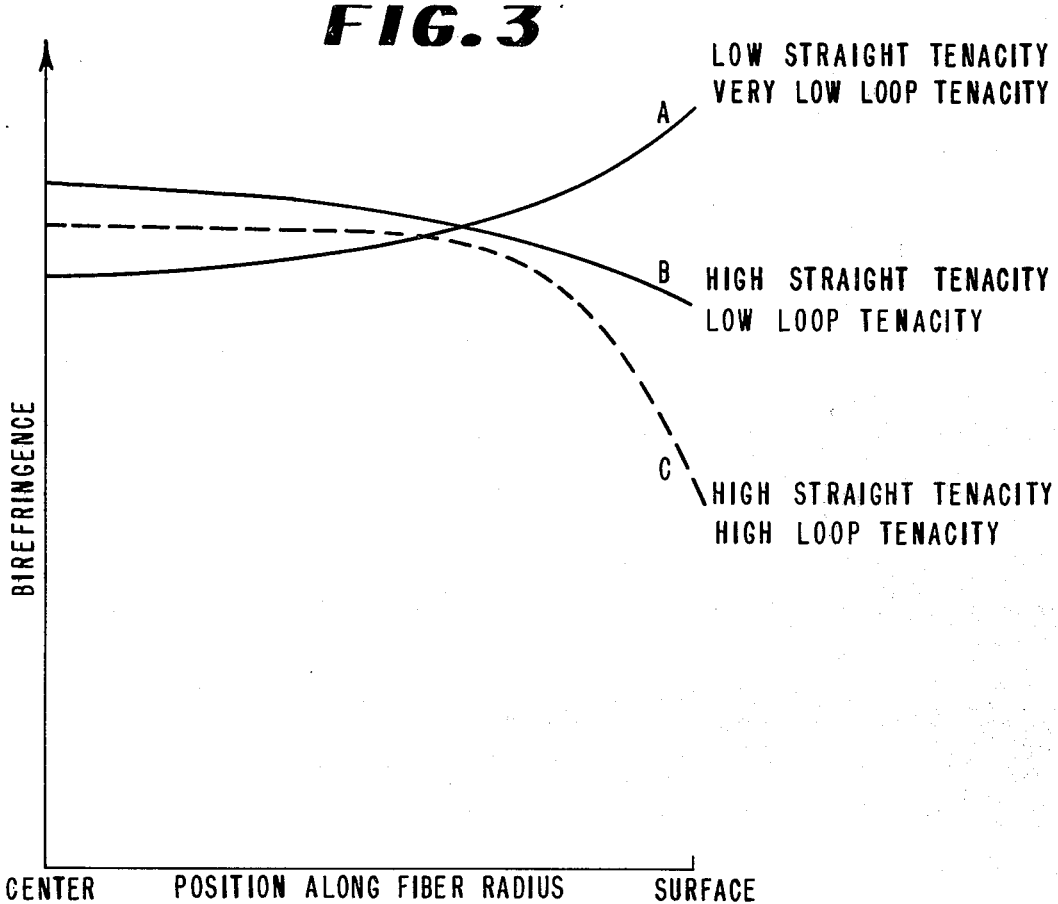
FIG. 3 is a schematic representation of a graph of birefringence versus position of measurement for three different filaments to illustrate the relationship between birefringence profiles and filament tenacity.

By polyethylene terephthalate, we mean a fiber forming polymer in which at least 95 mol % of the repeating units are units having the structure

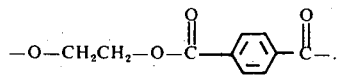

Other dicarboxylic acid residues and diol residues may be present in minor quantities, i.e., up to about 5 mol %. Examples of such other dicarboxylic acids are naphthalene-2,6-dicarboxylic acid, naphthalene-2,7-dicarboxylic acid, bibenzoic acid, p-terphenyl-4,4''-dicarboxylic acid, hexahydroterephthalic acid and adipic acid. Examples of other diols which may be included in the polymer molecule include diethylene glycol, other polymethylene glycols having 3 to 10 carbon atoms, and hexahydro-p-xylylene glycol.

By the term denier we mean the weight in grams of 9000 meters of monofilament. The monofilaments of the invention have denier of at least 1000 and preferably at least 1500, with deniers up to 10,000 or more beng included. For round monofilaments, this denier range covers filaments having diameters from about 13 mils (0.013 inche; 0.033 cm.) up to about 40 mils (0.040 inch; 0.102 cm.)

By the term intrinsic viscosity we mean the limit of the natural logarithm of the ratio of solution viscosity to solvent viscosity, divided by the concentration of the polymer solution in grams of polymer per 100 ml. of solution, as the concentration approaches zero. The intrinsic viscosity values reported herein are measured in a solvent consisting of 25% trifluoroacetic acid mixed with 75% methylenechloride, by weight. The polymer is dissolved in the solvent at room temperature and the viscosity measurements are made in an Ostwald-Fenske capillary viscometer at 25°C. The monofilaments of the invention are composed of polymer having an intrinsic viscosity of at least 0.6 and preferably 0.75 and higher.

By straight tenacity we mean the breaking load in grams divided by initial denier for a single length of monofil. Tenacity measurements reported herein are made on an Instron Tensile Testing machine using a 10 inch (25.4 cm.) sample length, an extension rate of 120% per minute, with the sample being held in type 4D Instron clamps. Measurements are made at room temperature.

Loop tenacity is obtained analogously to the straight tenacity defined above. It differs only in that two lengths of monofilament are used, each forming a loop by having both ends fastened in the same jaw of the tester, with the two lengths in opposite jaws so that one loop passes through the other and each straightened loop is about 6 inches (15.5 cm.) long. Loop tenacity is computed by dividing the breaking load in grams by twice the initial denier of the individual monofilament.

The internal structure of the monofilaments of the invention is best characterized by means of birefringence measurements, which are an indication of polymer chain segment orientation. In order to describe the filaments adequately, we refer to three quantities: $\overline{\Delta n}$, the birefringence averaged along a monofil diameter (a diameter of the circle most nearly approximating the cross sectional shape), the integrated average birefringence level IAB, and a difference factor δ which indicates the difference between the $\overline{\Delta n}$ birefringence value of the filament and birefringence measured near the surface of the filament.

Figure 2A:
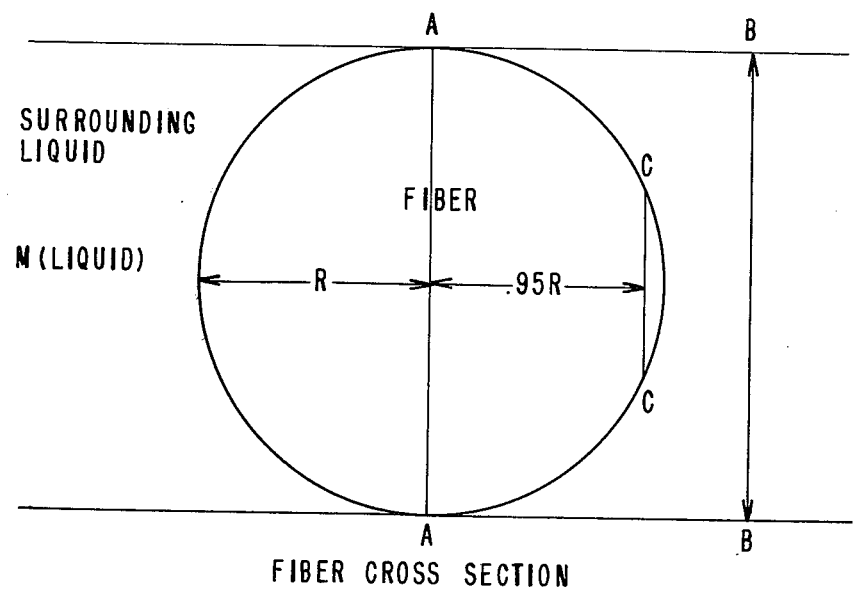
FIG. 2A is a schematic representation of the cross section of a fiber immersed in a liquid for examination, showing a fiber diameter AA and a chord CC.
Figure 2B:
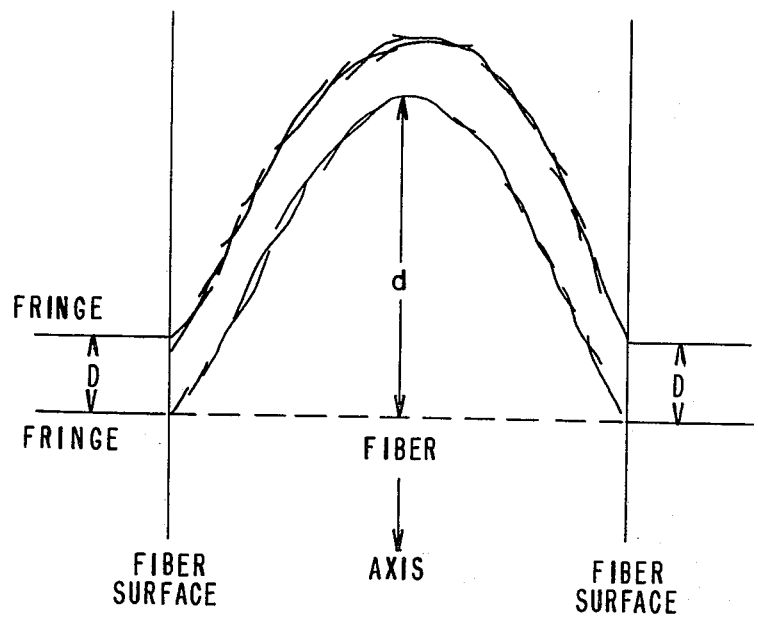
FIG. 2B is a schematic representation of the interference fringe displacement seen when the fiber of FIG. 2A is observed under a Leitz interference microscope.

$\overline{\Delta n}$, the average birefringence along a monofil diameter is determined by measurement with a double beam interferometer such as the Leitz interference microscope. [One procedure is described by H. Hannes in Kolloid Zeitschrift und Zeitschrift fuer Polymere 250, 765-774 (1972) August.] This microscope measures the optical path difference (OPD) between light rays such as AA and BB (see FIG. 2) by the displacement of an interference fringe. Measurements are made on the monofil immersed in a liquid of known refractive index. The OPD is equal to $\lambda$ d/D where $\lambda$ is the wave length of the light used (0.546 microns for the measurements reported herein), D is the fringe period and d is the fringe displacement. The average refractive index of the monofil along path AA is OPD/AA + $n$ (liquid), where OPD is positive if the monofil refractive index is higher than the surrounding liquid and negative if the monofil refractive index is lower than the surrounding liquid. For determination of $\Delta n$, the monofil refractive index is measured in the above manner with light polarized parallel to (giving $n \parallel$) and perpendicular to the monofil axis (giving $n \perp$). Generally two different surrounding liquids will be required, in the range 1.70-1.73 for $n \parallel$ measurements and 1.53-1.60 for $n \perp$. Then from the above measurements, $\overline{\Delta n} = n \parallel - n \perp$ The difference factor is determined from the following relationship:

$$\delta = [\overline{\Delta n} - \Delta n (0.95 R)] \times 10^4,$$

where $\overline{\Delta n}$ is the average birefringence along a filament diameter as determined above and $\Delta n$ (0.95 R) is the average birefringence along the chord CC (FIG. 2) which is at a distance from the center of the filament equal to 0.95 of the filment radius, i.e., 0.95 of the distance from the monofil center to the monofil surface. The mechanics of the measurement are the same as for $\overline{\Delta n}$ above. Positive vaues of δ indicate that the birefringence at the filament center is greater than the birefringence near the surface. Negative vaues of δ indicate that the birefringence near the surface is greater than the birefringence at the filament center. To counteract the effect of asymmetries, it is important that that $\Delta n$ (0.95) values be averages of measurements made along chords at opposite ends of a fiber diameter.

In making birefringence measurements by the above method, the surrounding liquid used should nearly match the refractive index of the monofil to facilitate identification of the interference fringe outside the fiber which connects with a particular fringe within the fiber, so that the fringe displacement $d$ will be measured correctly and errors resulting from refraction of light by the fiber will be minimized.

In the event that the monofil cross section is not round, δ should be measured on a thin (less than 4 mils) longitudinal section of uniform thickness cut from the monofil. This section should be from a plane oriented perpendicular to the axis around which the monofil wll bend in the loop test, and should be from a position within the monofil which will contain the region of maximum tensile strain in the loop test, as determined from purely mechanical considerations. For an elliptical monofil, for example, this plane should be perpendicular to the filament-cross-section's major axis and be centered with respect to the minor axis.

It is important that the $\overline{\Delta n}$ and $\Delta n$ (0.95) values be averages of a representative number of determinations along the length of a monofilament. Generally, a fairly uniform monofilament sample will require about 10 determination of birefringence made at random distances along the length of the filament.

By integrated average birefringence (IAB) we mean the weighted average of the radial distribution of birefringence across the monofilament. Radial birefringence distribution and its calculation from interferometric refractive index determinations is discussed fully by Hannes in *kolloid Zeitschrift and Zeitschrift fur polymere*, Volume 250, pages 765–774 (August 1972). For the purpose of calculating the radial birefringence distribution, the filament cross section is considered as being made up of 10 concentric shells (rings) of equal thickness (Hannes FIGS. 8 and 9), each shell being homogenous with respect to birefringence. With 10 shells, the assumption of homogeneity within each shell has been found to be a good approximation of the actual conditions. A series of 10 birefringence measurements are made across the filament at points coincident with chords drawn through the filament, parallel with the microscope axis, and tangent to the inner edge of each of the shells, with the measurement for the center shell (shell No. 1) being coincident with the fiber diameter. Each of these measurements is considered a chord average birefringence. It will be appreciated that the chord average birefringence at any point $l$ will be determined by the birefringence of each shell through which the light ray has passed times the length of the path through that shell, all divided by the sum of the path lengths, as indicated in the following formula:

$$\overline{\Delta n_i} = \frac{(\Delta n_{10} \times d_{10} + \Delta n_9 \times d_9 + \Delta n_8 \times d_8 \ldots + \Delta n_i \times d_i)}{d_{10} + d_9 + d_8 \ldots + d_i},$$

where $\overline{\Delta n_i}$ is the chord average birefringence for the chord tangent to the inner edge of the $i$th shell, $\Delta n_{10}$ is the average birefringence in the tenth shell, $d_{10}$ is the distance through shell 10 along cord $i$, $\Delta n_9$ is the average birefringence of shell 9 and $d_9$ is the distance through shell 9 along chord $i$, etc. Since all of the path lengths can be calculated directly from the geometry of the filament and since the average birefringence of the outer shell 10 is obtainable by direct measurement along chord 10, it is possible to work backwards from shell 10 to shell 1, calculating the average birefringence for each of the interior shells in turn. With the calculated values for the average birefringence of each of the 10 shells available, one then calculates the integrated average Birefringence (IAB) from the expression:

$$IAB = \sum_{i=1}^{10} \frac{\Delta n_i \times \text{Area of ring } i}{\text{cross section area of fiber}}$$

For most polyester monofilaments, a sufficient characterization of the internal structure is given by a combination of the average birefringence $\overline{\Delta n}$ and the difference factor $\delta$. Only in those rare instances when the value of $\delta$ is greater than 200 is it necessary to calculate IAB to distinguish between monofilaments of the invention and those outside the invention. The monofilaments of the invention have IAB values of at least 0.186 when $\delta$ is above 200.

PROCESS CONSIDERATIONS

In general, the heavy denier monofil of this invention, having both good straight tenacity and good loop tenacity, is prepared by a process in which molten polyethylene terephthalate of at least 0.6 intrinsic viscosity is extruded to form a monofilament which is quenched and then drawn at an elevated temperature to the break elongation desired for the intended end use.

Preferably the polymer is extruded under high shear conditions through an air gap of at least 16 inches and quenched in a water bath to produce an undrawn monofilament having a $\delta$ value of at least +15, e.g., as illustrated in Examples I, II and IV. This monofilament can then be drawn by conventional methods to produce the desired properties.

The preferred spinning conditions are not essential for producing products of this invention, as illustrated in Example III. When using the above general process, the properties of the monofilament can often be improved by drawing the monofilament to a total draw ratio of at least 6 X in a multistage drawing process wherein an unusually high temperature is used for at least the first stage draw to heat the surface of the filament to a much higher temperature than the core of the filament at the time the filament is being drawn.

Close control of process conditions is important while supplying molten polyethylene terphthalate having an intrinsic viscosity of at least 0.6 to an extrusion die, extruding a filament through an air gap into a water quench bath, withdrawing the quenched undrawn filament from the bath and then drawing the filament in two stages under controlled heating conditions to provide the final drawn monofilament.

The desired value of $\delta$ in the spun monofilament may be obtained by proper choice of the polymer viscosity, the extruding capillary diameter and temperature, the air gap distance, and the spinning speed. These variables are interrelated and a change in any one affects the result obtained. The polymer intrinsic viscosity must be at least 0.6, and the choice of other conditions will depend upon the actual intrinsic viscosity used. The extrusion conditions should be adjusted to provide adequate shear stress without causing melt fracture. Melt fracture may be easily recognized in the extruded filament by the very rough surface obtained. Shear stress is increased by using a smaller hole size, by increasing the polymer intrinsic viscosity, by decreasing the die temperature, and by increasing polymer throughput. The maximum shear stress obtainable without encountering melt fracture conditions is also somewhat dependant on the entrance geometry of the hole in the extrusion die. The air gap between extrusion die and water quench bath should be large. Air gap distances of at least 16 inches are preferred, with distances up to 36 inches or more giving excellent results. The maximum operable air gap is easily recognized as that distance at which the force of gravity on the extruded filament results in excessive attenuation of the filament.

Generally the filament enters the water quench bath, goes around a change of direction pin or roll and then out of the quench bath and around feed rolls which determine speed of the filament leaving the bath (spinning speed). This speed should be slow for high positive values of δ. Increasing the feed roll speed decreases the value of δ even if the polymer throughput is increased to provide constant denier. Speeds of 80 to 100 ft./min. have been found useful.

The extruded monofilament is preferably drawn in two stages under controlled heating conditions. If the extrusion conditions are not such as to give high positive values of δ, then the monofilament must be drawn under conditions which insure that the exterior surface of the filament, during drawing, is considerably hotter than the center of the filament. As illustrated in the examples, this may be achieved by use of high temperature radiant heat.

ILLUSTRATION OF PREFERRED EMBODIMENTS

In the following exampls, polyethylene terephthalate flake, free or delusterant, is dried in a nitrogen purged vacuum oven at 170°–200°C. for at least 15 hours, and then put into a nitrogen blanketed hopper. From the hopper the polymer is fed to a screw melter where it is melted and metered through filtering screens to an extrusion die. The extruded filament passes through room air (air gap) into a water quench bath maintained at a constant temperature. In the bath, the filament passes through 1–2 inches of water and then encounters a stationary change of direction pin which has a polished metal surface. The filament passes around the pin, undergoing a change of direction of about 120°, and then exits the bath and is wrapped 3 to 5 times around a pair of smooth feed rolls, which are fitted with a nip roll against the lower feed roll. The feed rolls are operated at a constant controlled speed. From the feed rolls, the undrawn monofilament passes through a radiant heater (Lindberg Model 70 combustion tube furnace having an inside diameter of 1¼ inch and a length of 12 inches and having a 750 watt capacity at full voltage) from which the filament proceeds to a second pair of rolls (first-stage draw rolls). The monofilament passes one to two times around the second pair of rolls and then passes through a long hot-draw zone made by connecting 5 of the 12-inch Lindberg Model 70 furnaces described above. The temperature of these furnaces is controlled by thermocouples positioned in the interior air space about ½ inch from the inside wall of the furnace. The filament then proceeds to a third set of rolls (second stage draw rolls), is passed around the draw rolls 4 to 6 times and then proceeds to a constant tension windup. The exact conditions used for each example and the properties of the filaments produced are recorded in Table I.

Inspection of the data in the Table reveals the outstanding monofilament properties provided by the present invention.

In the Table, Examples No. 1 and 2 illustrate the preparation of good monofilaments by a process in which both the spinning and drawing conditions are under good control.

Examples 3 and 8 illustrate the preparation of monofilaments by a process in which the spinning conditions are not optimum (air gap too short) and the spun filament has a negative δ value. In Example 3 the effect of poor spinning conditions was corrected by using an exceptionally high temperature in the first-stage drawing step so that the final drawn filament had a high value of δ. In Example 8, for comparison, where drawing conditions approximating those of Example 2 were used for the improperly spun monofilament of Example 3, a monofilament with poor properties was obtained.

Example 9 illustrates that a high average birefringence $\overline{\Delta n}$ is not sufficient for good strength. Note that this sample has a δ value of −20 and that both straight tenacity and loop tenacity are low.

Although the monofilament of Example 6 has a very good loop tenacity, the straight tenacity is only mediocre. It is noteworthy in this instance that although the δ value is extremely high, the value of $\overline{\Delta n}$ is low (0.188) and the value of IAB is low (0.183).

A comparison of Examples 2 and 7 illustrates the effect of air gap distance during spinning on subsequent properties. Note that in Example 7, the air gap was only 7.75 inches, which gave a spun filament having a low δ value of −13. In contrast, the air gap of 28 inches in Example 2 gave a spun filament with a good δ value of +17. Although the two fibers are drawn in exactly the same manner, it is noted that there is a tremendous difference in tensile properties. Example 7 has a loop tenacity of only 0.9 whereas Example 2 has a loop tenacity of 5.9 gpd. The improvemet afforded by the monofilament of the invention is surprising.

TABLE I

PROCESS CONDITIONS AND PRODUCT CHARACTERISTICS

| Example No. | Examples of the Invention | | | | | | Comparison Examples | | |
|---|---|---|---|---|---|---|---|---|---|
| | I | II | III | IV | V | VI | VII | VIII | IX |
| Polymer Throughput, lbs/hr | 5.5 | 8 | 8 | 8 | 5 | 8 | 8 | 8 | 8 |
| Die Diameter, mils | 120 | 125 | 125 | 200 | 200 | 125 | 125 | 125 | 200 |
| Die Entrance Angle | 55° | 60° | 60° | 55° | 120° | 60° | 60° | 60° | 55° |
| Die Temperature °C | 294° | 390° | 325° | 288° | 290° | 350° | 390° | 325° | 288° |
| Air gap to H$_2$O quench, inches | 36 | 28 | 6 | 28.5 | 18 | 28.5 | 7¾ | 6 | 6 |
| H$_2$O quench temperature, °C | 50° | 65° | 56° | 50° | 55° | 51° | 65° | 56° | 50° |
| H$_2$O quench distance, inches | 29.5 | 29.5 | 30 | 29.5 | 9 | 29.5 | 29.5 | 30 | 29.5 |
| Diameter of change of direction pin, in. | 3.0 | 2.25 | 2.25 | 2.25 | 1.0 | 2.25 | 2.25 | 2.25 | 2.25 |
| Feed roll speed, feet/minute | 92 | 90 | 91 | 91 | 80 | 90 | 90 | 91 | 91 |
| Length of 1st stage heater, ft | 1.5 | 1.0 | 1.0 | 1.0 | 1.5 | 1.5 | 1.0 | 1.0 | 1.0 |
| Temperature of 1st stage heater, °C | 700 | 703 | 790 | 715 | 575 | 610 | 703 | 710 | 715 |
| 1st draw roll speed, feet/minute | 332 | 325 | 330 | 328 | 320 | 325 | 325 | 330 | 328 |
| 1st stage draw ratio | 3.6X | 3.6X | 3.6X | 3.6X | 4.0X | 3.6X | 3.6X | 3.6X | 3.6X |
| Length of 2nd stage heater, ft | 5 | 5 | 5 | 5 | 4 | 5 | 5 | 5 | 5 |
| Temperature of 2nd stage heater, °C | 525 | 675 | 675 | 670 | 500 | 615 | 675 | 675 | 675 |
| 2nd stage draw roll speed, ft/min | 554 | 540 | 540 | 546 | 483 | 558 | 540 | 540 | 547 |
| Total draw ratio | 6.1X | 6.0X | 6.0X | 6.0X | 6.0X | 6.2X | 6.0X | 6.0X | 6.0X |
| Intrinsic viscosity | 1.03 | .96 | .94 | .96 | .86 | 1.02 | .96 | .96 | .94 |

TABLE I-continued

| Example No. | PROCESS CONDITIONS AND PRODUCT CHARACTERISTICS | | | | | | | | |
|---|---|---|---|---|---|---|---|---|---|
| | Examples of the Invention | | | | | | Comparison Examples | | |
| | I | II | III | IV | V | VI | VII | VIII | IX |
| Denier | 2010 | 3260 | 3030 | 3200 | 2410 | 3030 | 3320 | 3080 | 3090 |
| Tenacity g/den | 8.4 | 7.8 | 7.2 | 7.0 | 7.4 | 5.5 | 7.0 | 6.8 | 3 to 5 |
| Elongation, % | 11% | 16% | 11% | 17% | 16% | 12% | 12% | 9% | 4% |
| Loop tenacity g/d | 6.1 | 5.9 | 4.5 | 5.1 | 4.8 | 5.2 | 0.9 | 1.5 | 0.4 |
| Drawn $\overline{\Delta n}$ | .195 | .194 | .195 | .190 | .193 | .188 | .193 | .194 | .194 |
| Drawn $\sigma$ | +110 | +130 | +140 | +145 | +100 | +410 | +30 | +75 | −20 |
| Spun $\sigma$ | +25 | +17 | −8 | +20 | +11 | — | −13 | −8 | −45 |
| Spun $\overline{\Delta n}$ | .0008 | .0008 | .0012 | .0010 | .0007 | — | .0013 | .0012 | .0012 |
| Integrated Average birefringence | .197 | .194 | .194 | .188 | .194 | .183 | .194 | .194 | .196 |

We claim:

1. A polyethylene terephthalate monofilament having an intrinsic viscosity of 0.6 to about 1, a denier of 1000 to 10,000, a straight tenacity of 6.0 to 10.0 grams per denier, a loop tenacity of 5.0 to 7.0 grams per denier, and an internal structure which is substantially uniform except for lower polymer chain segment orientation near the surface as evidenced by birefringence measurements along a diameter, the structure being characterized by an average birefringe ($\overline{\Delta n}$) of 0.190 to 0.196, and an average difference factor ($\delta$) of 90 to 200.

2. A monofilament as defined in claim 1 wherein the intrinsic viscosity is at least 0.75.

* * * * *